Aug. 5, 1952  R. F. STAMM  2,605,672
WERNICKE PRISM SPECTROMETER
Original Filed March 21, 1945  4 Sheets-Sheet 1
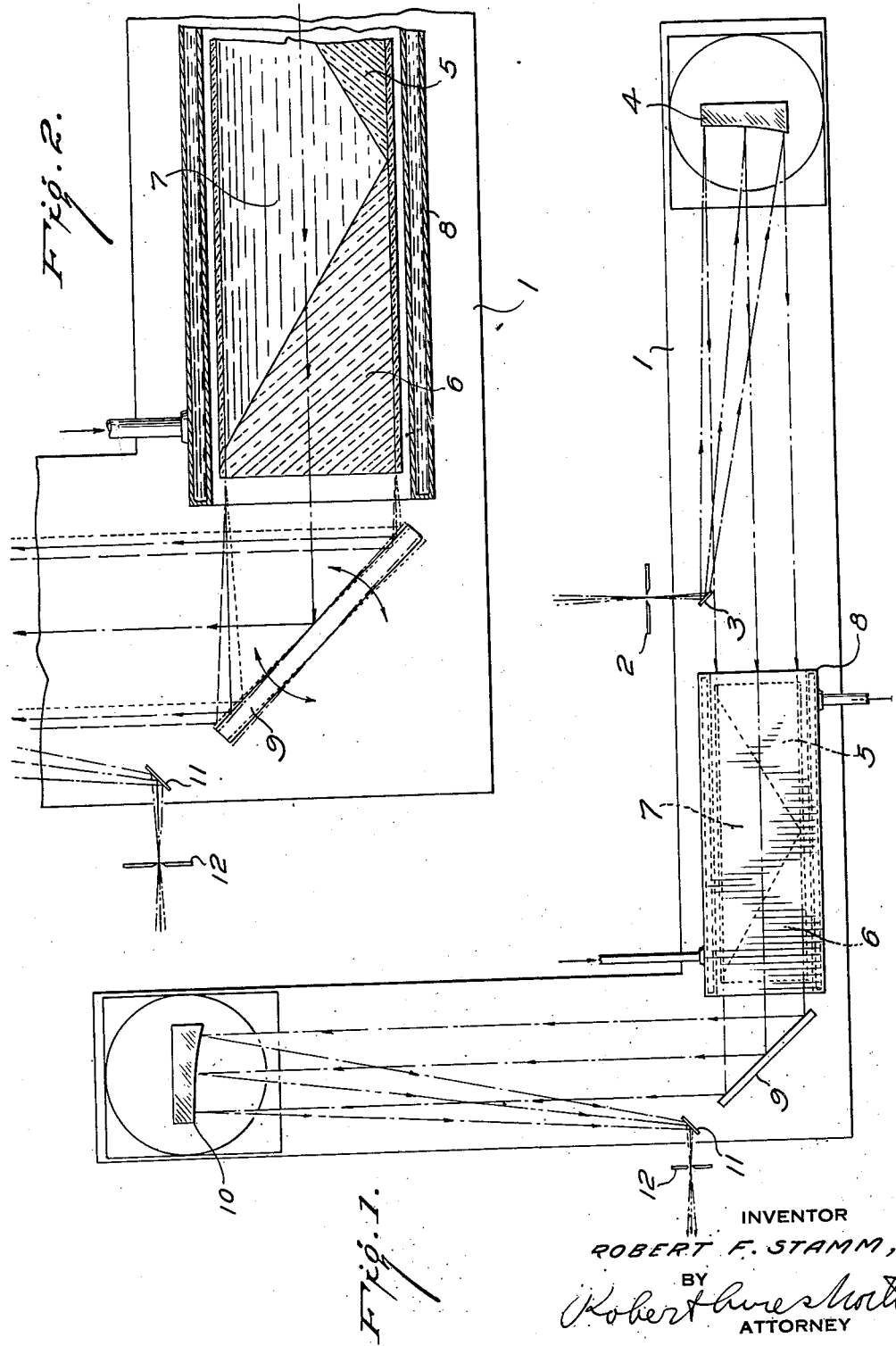
INVENTOR
ROBERT F. STAMM,
BY
ATTORNEY

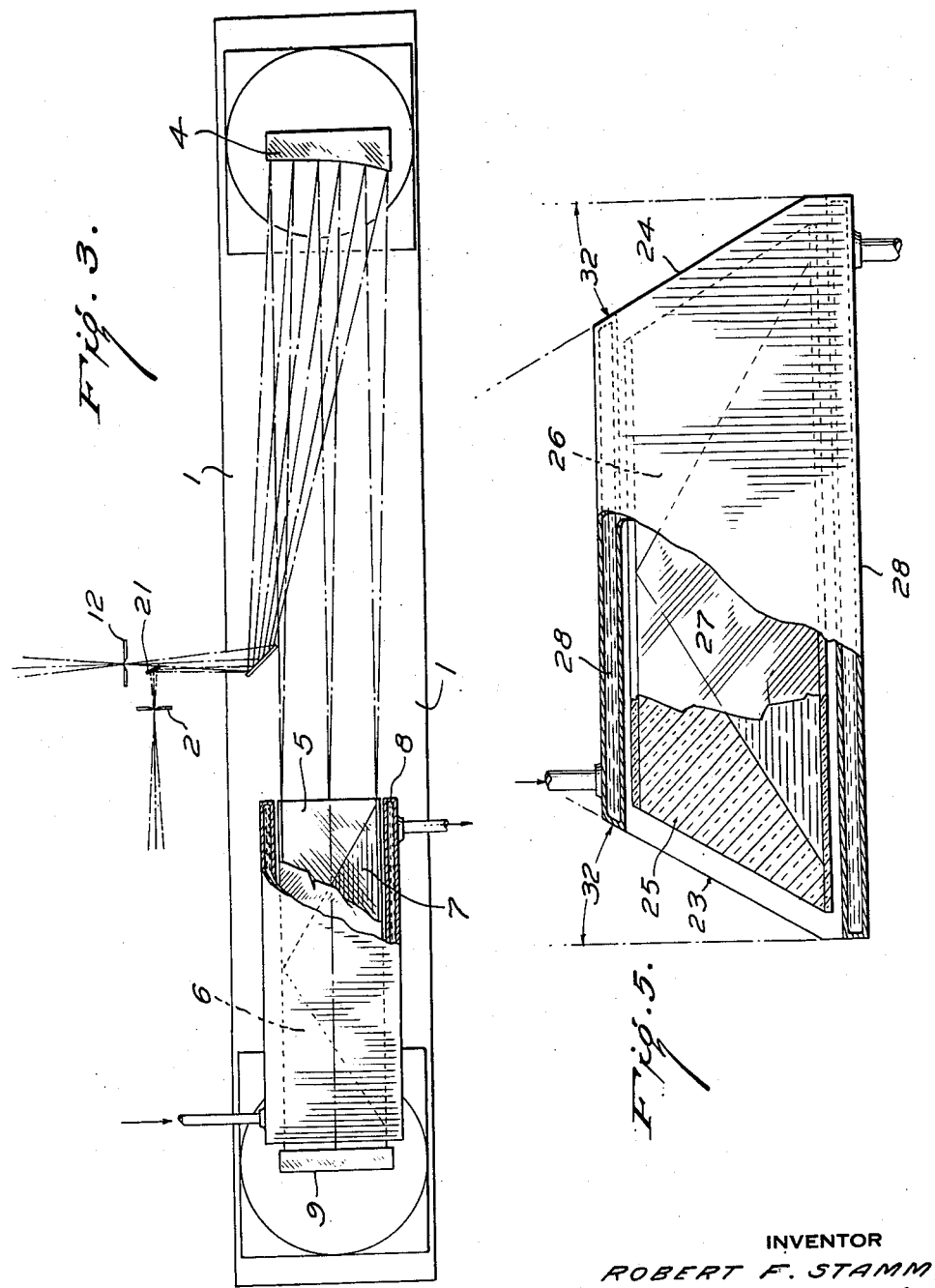

Aug. 5, 1952   R. F. STAMM   2,605,672
WERNICKE PRISM SPECTROMETER

Original Filed March 21, 1945   4 Sheets-Sheet 3

INVENTOR
ROBERT F. STAMM,
BY
ATTORNEY

Patented Aug. 5, 1952

2,605,672

UNITED STATES PATENT OFFICE 2,605,672

WERNICKE PRISM SPECTROMETER

Robert Franz Stamm, Stamford, Conn., assignor to American Cyanamid Company, New York, N. Y., a corporation of Maine Original application March 21, 1945, Serial No. 583,957, now Patent No. 2,483,244, dated September 27, 1949. Divided and this application March 29, 1949, Serial No. 84,191

14 Claims. (Cl. 88—14)

This invention relates to improved spectrometers and monochromators using Wernicke prisms.

Devices which are capable of dispersing light to form spectra are extensively used in spectrophotometric work. Essentially the optical arrangements of such instruments include an inlet slit and an exit slit with dispersing means between the two. If a white light is introduced into the inlet slit a spectrum is formed and a monochromatic light of various wave lengths throughout the spectrum can be obtained from the exit slit. When so used apparatus of this type is normally referred to as a monochromator. Precisely the same type of instrument may be used as a detector of monochromatic radiation or radiation having spectral lines striking the inlet slit with suitable light detecting means at the exit slit. When so used the apparatus operates as a spectrometer or spectrophotometer. While the two methods of using the apparatus are quite different in their nature, optically the apparatus is essentially the same, and it is with improvements in the optics of this class of devices that the present invention deals.

Normally monochromators and spectrometers utilize dispersing prisms or gratings in order to produce a spectrum from a white light or to selectively transmit a monochromatic light when operating as a spectrometer. A number of characteristics are desirable, some of which are not obtainable without a compromise. Thus it is desirable to have device of high dispersion so as to separate light of closely adjacent wave lengths to a maximum degree. A second requirement is high efficiency of light utilization. For many purposes the amount of light energy available at particular wave lengths is very small and great efficiency in wide transmission is necessary in order to retain sufficient energy to operate the device with reliability. A type of use which poses particularly severe conditions on the instrument is its use as a spectrometer for detecting or recording Raman spectra. These spectra are composed of lines of relatively low energy, many of which are closely spaced and require maximum utilization of light, and the greatest possible linear dispersion which is measured in terms of mm./Å., that is to say, the number of millimeters by which two lines differing by one Ångstrom in wavelength are separated in an optical system of standard magnification. For a given focal length and prism aperture the higher the angular dispersion of the prism the greater the linear dispersion and the greater the energy output of the spectrometer at constant resolution. Conversely the same energy output can be obtained from a more compact instrument.

The ordinary prisms used in spectrometers are made of various glasses. High dispersion is usually associated with flint glasses, which are not free from color. If a series of prisms are used reflection losses mount up so that the efficiency of the instrument becomes unsatisfactory. There has been an unfilled want for many years for a more satisfactory way of obtaining high dispersion without the excessive light losses and other difficulties referred to above.

Some sixty years ago a new type of prism was built by Wernicke. This prism was in three parts, a central liquid prism and two end prisms of crown glass, the faces of the crown glass prisms being either perpendicular or slightly inclined. Wernicke used liquids such as methyl salicylate or ethyl cinnamate. The prism showed a markedly higher dispersion and as a new product was of interest to physicists interested in the fundamentals of spectroscopy.

The greatly increased dispersion of the Wernicke prism causes the light rays to strike the lenses used in the spectrometer at much sharper angles than is the case with ordinary prisms, and of course the greater departure from the paraxial condition causes the aberrations of the lens to increase to a point where the quality of image is inferior. Despite its theoretically greater dispersion a spectrometer designed along conventional lines and using a Wernicke prism constitutes an instrument which is inferior for practical operation to an instrument using ordinary prisms for dispersion, and for this reason Wernicke prisms have not been considered suitable for use in ordinary spectrometers and monochromators. Thus, these prisms have been used only for other purposes where they did not make impossible demands on the other optical components.

The most important single field for the improved optical system of the present invention lies in instruments in which there is an exit slit, rather than those where a whole spectrum or a large region thereof is photographed on a single plate or film. In such instruments variations due to change in wave length of the light are of predominant importance. In other words, among the most serious drawbacks to optics using lenses are the chromatic aberrations. These are not only expensive to correct even partially in a high aperture objective, but it is impossible in any practical objective to correct asbolutely. A compromise is necessary which corrects or minimizes aberration for a number of wave lengths, frequently two wavelengths. A well made parabolic mirror is completely free from chromatic aberration, that is, its focal length does not change with the wave length of light. The instrument may therefore be constructed with a fixed separation of exit-slit plane and mirror, and the exit slit is always in perfect focus and does not require any complicated movement to change its position with the particular portion of the spectrum which is being transmitted.

The present invention relates to spectrometers or monochromators which use Wernicke prisms, enjoying the full advantage of the great dispersion possible with this type of instrument, and at the same time being free from any of the disadvantages which showed up in the ordinary design of spectrometer when it is attempted to use a Wernicke prism. In other words, the present invention permits the construction of a spectrometer or monochromator with a Wernicke prism which, instead of being inferior in practical operation to a spectrometer using ordinary prisms, is markedly superior.

The improved result, as far as spectrometer or monochromator design is concerned, is a combination of Wernicke prisms with a particular type of imaging or focusing optics. Instead of lenses which cannot be produced at any reasonable price in short focal lengths sufficiently corrected to handle the wide dispersion produced by a Wernicke prism, off-axis parabolic mirrors are used. Such mirrors have been known for many years, but it was not realized until the present invention was made that it is possible by combining off-axis parabolic mirrors with one or more Wernicke prisms to produce an instrument which retains all of the dispersion advantages of the prism, and instead of producing an image of greatly inferior quality when short focal lengths are employed, produces an image, the quality of which is in no way inferior, and in many cases is superior to that produced in spectrometers using ordinary prisms.

In the claims the term "off-axis parabolic mirror" is used in the sense described on page 82 of the 1944 edition of Experimental Spectroscopy by Ralph A. Sawyer, that is to say a portion of the surface of a paraboloid where the center ray of the bundle from a source at the principal focus of the paraboloid to the center of the portion makes an angle with the axis of the paraboloid. This angle defines the degree by which the portion of the parabolic mirror is off-axis. The reflected center ray is, of course, parallel to the axis of the paraboloid but is displaced therefrom.

The term "axis" as applied in the claims to the Wernicke prism means the geometrical center line of the prism parallel to the long dimension of the prism assembly.

The new spectrometer of the present invention not only permits high linear dispersion of an order of magnitude never hitherto practical in an instrument of useful size with excellent image quality, but it is possible, without prohibitive cost, to increase very markedly the speed of the instrument. Due to its construction the cost of a Wernicke prism does not increase nearly so rapidly with increase in size as is the case with prisms of glass. Therefore, it is possible to use a large prism with correspondingly great intensity of illumination at the slit without running into prohibitive costs.

It is an advantage of the present invention that the design of the Wernicke prism is not critical. The center angle of the liquid prism may vary from considerably less than 120° up to as much as 160°. For work with certain types of polarized light the present invention permits a very great reduction in light loss by reflection. In an ordinary prism, as used in a spectrometer, light strikes the face of the prism at angles of incidence of more than 50°. In fact, normally its angle of incidence has practically Brewster's angle for light polarized in a vertical plane. Very high light loss results in such cases. This is particularly serious when spectrometers or spectrographs are used with Raman spectra, because in many cases the lines in a Raman spectrum are strongly polarized and, unfortunately, the vertical polarized component is normally the one which contains the larger portion of the total energy.

When polarized Raman spectra are produced illumination has to be in one line, which reduces the total amount of illumination that can be used, because only light from two opposite directions can be employed. The energy is therefore low and light losses become more serious, particularly as in ordinary prisms they are at a maximum in the polarized component which is strongest. Moreover, it is often important to measure the relative amount of polarization and this cannot be done easily if the spectrograph selectively reflects one of the components. For both of these reasons the spectrographs of the present invention present great improvements over those employing ordinary prisms.

In the Wernicke prism or prisms as used in the present invention, the light may strike the end face of the crown glass prisms normally, or, if they are inclined the angle of inclination will be much smaller than in the case of an ordinary prism. For use with unpolarized light, that is to say, light which may be considered as composed of equal amounts of energy in the various planes of vibration, the losses by reflection do not become excessive until the angle of incidence of the light on the outer face of the glass prism exceeds 35°. Beyond 40° of angle of incidence the losses become considerable and the present invention does not contemplate the use of Wernicke prisms having end faces the inclination of which produces angles of incidence more than 40° for instruments which are to be used with unpolarized light. In the case of polarized light, where a major portion of the energy lies in the vertical polarized component, such as the case with unpolarized Raman lines, the angle of incidence should not exceed 25°.

When the instrument of the present invention is to be used with polarized Raman spectra, and it is desired, among other things, to determine the degree of polarization, it is important to use end faces which make an angle of 90° with the base of the liquid prism, so that there will be no selective light loss in either component, even though the numerical value of the loss might not be excessive for small angles of inclination of the end faces.

It is an advantage of the present invention that there is a considerable latitude in the design of the Wernicke prism, particularly when used with unpolarized light, and where the maximum of dispersion is desired it is sometimes advantageous to use a prism with inclined end faces, because the increased light loss may be sufficiently moderate to be acceptable. Although the light loss does not increase at a very rapid rate until 25° is reached for vertical polarized, and 40° for unpolarized light, light losses are greater when the light strikes the prism face at an angle which is not normal and for instruments in which light losses are to be kept to the minimum, or when polarization measurements are to be made, I prefer to use Wernicke prisms with vertical end faces. Where minimum light loss is essential the reflection losses may be even further decreased by well known surface coatings which reduce reflection.

The preferred embodiment of the present invention utilizes Wernicke prisms with vertical end faces and 120° central angle. The remainder of the specification will deal with prisms having this central angle, although as has been pointed out, prisms using other central angles are included in the broad scope of the present invention. When the preferred type of liquids are used in the Wernicke prisms dispersion can be greatly increased, and by using an optical path in which the light passes through the Wernicke prism twice, it is possible to produce an angular dispersion of from 12° to 24° between the 4358 Å. and 5200 Å., the region used for Raman spectra work. The instrument can be housed in a box only about 41 inches long and short focus, and therefore economical high aperture parabolic mirrors may be employed. This compares with separation of about 3° for the same two lines when using in the first order a grating with 15,000 lines to the inch.

In order to obtain maximum efficiency in the Wernicke prism it should be filled with a liquid belonging to a particular class of organic compounds, namely, esters of cinnamyl and cinnamylidene derivatives of fatty acids of the aliphatic series. Typical members are esters of cinnamic acid, which may be considered as cinnamyl formic acid, ortho or para methoxy methyl cinnamates, cinnamylidene acetates, propionates, etc. The acids have the following formulae:

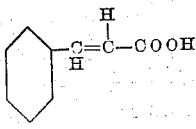

Cinnamic acid

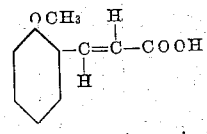

Orthomethoxy cinnamic acid

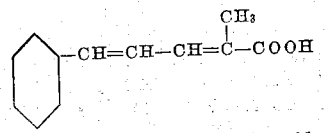

α Cinnamylidene propionic acid

All of the above compounds contain an ethylene group and are therefore capable of geometric isomerism. It is an advantage of the present invention that it does not make a great deal of difference which isomer is used as the dispersions of cis and trans isomers are comparable, although not identical. Most of the products are obtained predominantly in the form of the trans isomer, which is usually the more stable under more ordinary conditions. The ester of α cinnamylidene propionic acids leave two ethylene groups, both of which are capable of geometric isomerism. Four different isomers are therefore possible. The exact proportions of the different isomers in a technical product has not been determined. These isomers appear to have high dispersions and the relative proportions of the isomers in a product to be used in the present invention is therefore not a serious problem. The cinnamylidene fatty acids include those having methoxy substituents in the ortho or para position.

Wernicke prisms having their central cell filled with the preferred liquids referred to above are not claimed in the present application except in connection with the new spectrometers forming the subject matter of the present invention. The prisms are described and claimed in my U. S. Patent No. 2,483,244, September 27, 1949, of which the present application is a division.

Wernicke prisms using ethyl cinnamate give good results in the present invention but better results are obtained with cinnamyl and cinnamylidene derivatives having an orthomethoxy group on the benzene ring. These esters have as high and even higher dispersions than does ethyl cinnamate and, as pointed out above, the methoxy group appears to increase to a very marked extent the stability of the liquid. Among the new liquids methyl orthomethoxy cinnamate combines maximum stability with reasonable cost and high dispersion. It is therefore preferable from a practical standpoint, and Wernicke prisms containing this liquid are included as new prisms in the scope of the present invention.

The slight drop in transmission in the extreme violet resulting from a little scattering of light in passage through the preferred esters of the present invention should not be confused with the difficulties which result when a colored liquid is employed, because colored liquids usually show transmission losses in parts of the spectrum which are more important than the extreme violet. Therefore, known liquids for Wernicke prisms which are markedly colored are less desirable, although for certain purposes they may be used. Thus, aqueous solutions such as those of bromides of mercury and barium, which have been proposed for Wernicke prisms, may be used under certain circumstances in the present invention, but they are very markedly inferior in their general characteristics to the preferred esters of the present invention. They suffer from a marked yellow coloration.

The following table gives refractive index data for the methyl orthomethoxy cinnamate and also for several other known liquids, such as ethyl cinnamate, alpha bromonaphthalene and carbon disulfide. The data are given for a number of the permanent lines in the visual spectrum, the wave length of which is expressed in Ångstroms, and columns are given for rate of change of index with temperature and wave length, and a final column showing the amount of temperature change needed to cause displacement of .25 Å.

*Table I*

| λ ⟶ | Hα 6563 | Na 5893 | Hg 5461 | Hβ 4861 | Hg 4358 | Hγ 4341 | Hg 4047 | $\frac{(du)}{(d\lambda)}$ 4750 λ in cm. | $\frac{du}{dt} \times 10^4$ | $\frac{d\lambda}{dt}$ (Å/deg.) (4750) | Δt° to cause Δλ0.25 Å. |
|---|---|---|---|---|---|---|---|---|---|---|---|
| Ethyl cinnamate 20° | 1.55216 | 1.55982 | | 1.58043 | | 1.60053 | | | | | |
| α-bromnaphthalene 25.0° | 1.64629 | 1.65478 | 1.66231 | 1.67861 | 1.69936 | | 1.71721 | 2728 | 4.5 | 16.5 | .015 |
| α-bromnaphthalene 19.4° | 1.64995 | 1.65876 | | 1.68245 | | 1.70433 | | 3653 | 4.8 | 13.1 | .019 |
| methyl o-methoxy cinnamate 16.7° | 1.57609 | 1.58535 | | 1.61182 | | 1.64016 | | | | | |
| methyl o-methoxy cinnamate 20.0° | 1.57528 | | | 1.61090 | | | | | | | |
| methyl o-methoxy cinnamate 25.0° | 1.57367 | 1.58274 | 1.59102 | 1.60918 | 1.63548 | | 1.66598 | 4328 | 3.8 | 8.78 | .028 |
| methyl o-methoxy cinnamate 30.0° | 1.57159 | 1.58082 | 1.58915 | 1.60699 | 1.63362 | | 1.66338 | | | | |
| CS₂ 20° | 1.61865 | 1.62806 | | 1.65281 | | 1.67528 | | | | | |
| CS₂ 30° | 1.61078 | 1.62004 | | 1.64437 | | 1.66646 | | 3772 | 8.8 | 23.3 | .012 |

It will be apparent that the methyl ortho-methoxycinnamate is superior in all of the desirable characteristics, namely, linear dispersion, and in relative insensitiveness to temperature changes.

The invention will be described in greater detail in conjunction with the drawings, in which:

Fig. 1 is a diagrammatic representation of a spectrometer in which the light passes through the Wernicke prism once;

Fig. 2 is an enlarged section of the prism and rotatable mirror showing the range through which the mirror is rotated to cover the visible spectrum;

Fig. 3 is a diagrammatic representation of an autocollimated spectrometer in which the light passes through the Wernicke prism twice;

Fig. 5 is an enlarged elevation, partly broken away, of a Wernicke prism with inclined end faces.

Figure 4:
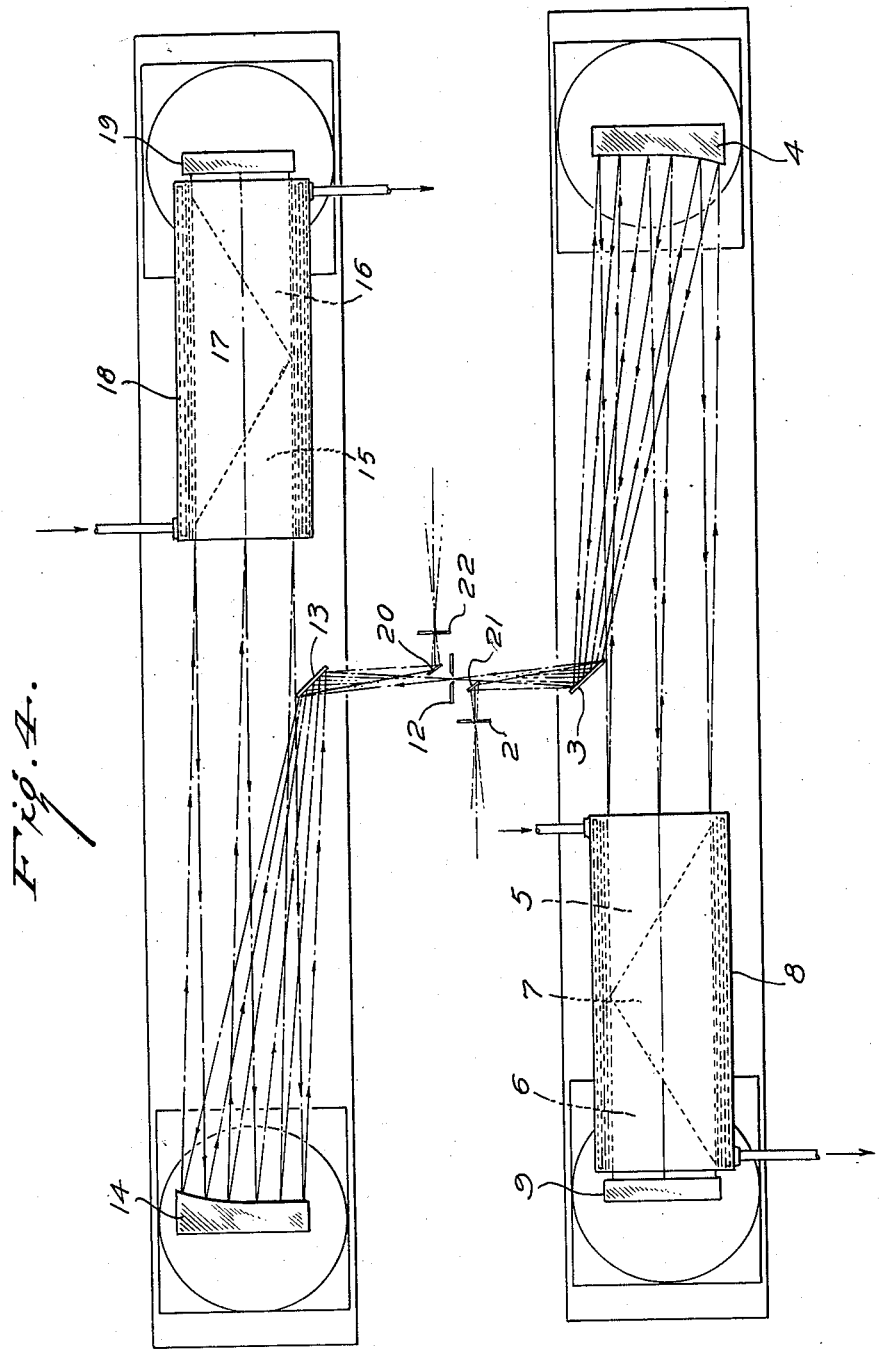
Fig. 4 is a diagrammatic representation of a double monochromator using two autocollimated Wernicke prisms.

Fig. 1 is a diagrammatic representation of the monochromating optics of a typical spectrometer. The optics are enclosed in a housing 1. Light enters through a slit 2 of conventional design which may be made adjustable, if desired. The beam of light from the slit is reflected by the diagonal mirror 3 into an off-axis parabolic mirror 4 so positioned that the light is collimated and passes as a parallel beam through a Wernicke prism having glass end prisms 5 and 6, and a central liquid prism 7, which may be filled with any suitable liquid, preferably a cinnamyl or cinnamylidene substituted acid ester. The prism is surrounded by a jacket 8 through which a liquid can be circulated from a suitable thermostatically controlled source so as to maintain the temperature constant in the prism. The beam is dispersed by the prism and strikes the movable mirror 9 from which it is reflected to a second off-axis parabolic mirror, which converges the beam imaging the entrance slit 2 onto exit slit 12, the beam being reflected by the diagonal mirror 11.

It will be seen from Fig. 2 that the amount of rotation of the mirror 9 is very small to cover the whole of the spectrum. The mirror requires rotation through less than 3° to cover the region from 4358 Å. to 5200 Å., the Raman spectra range, and less than 10° to cover the whole visible spectrum. Since the mirror 10 is stationary the same area of it will not be filled by any two different wave lengths of light unless the flat mirror is given a backward and forward movement combined with rotation to keep the beam image centered on the mirror 10. Because of the small amount involved the defect in the image is negligible for most uses and may therefor be neglected in practical instruments, which simplifies the mirror mount and drive mechanism very greatly.

While the instrument shown in Fig. 1 will give very satisfactory results, it requires a considerably larger space, and it is desirable for some types of work, notably with Raman spectra, to provide the same dispersion in an instrument of smaller size. I prefer, therefore, to use a spectrometer of the autocollimated type, which is illustrated in Fig. 3, the elements bearing the same reference numerals as in Fig. 1. The beam passes through the prism twice, which doubles the effective angular dispersion. Only a single off-axis parabolic mirror is needed, and it is possible in such an instrument to obtain maximum efficiency. When using a parabolic mirror of 50 cm. focal length and a prism which has crown glass end prisms having a refractive index of about 1.6207 at 4700 Å., with a liquid prism filled with trans methyl orthomethoxy cinnamate combining approximately .1% hydroquinone or tertiary butyl catechol (or an equivalent substance) as a polymerization inhibitor, optical results shown in the following table are obtained, the dispersion being given both in Å. per mm. and in mm. per cm.$^{-1}$.

*Table II*

| λ | Δ° | Δ rad. | mm. Arc rΔ at ½ Meter | Å. Gap | Å./mm. | mm./cm.$^{-1}$ |
|---|---|---|---|---|---|---|
| 4358 | 5° 42′ 16″ | .09956 | | | | |
| 4625 | 0 | 0 | 49.8 | 294 | 5.9 | |
| 5200 | 6° 4′ 4″ | .10589 | 52.9 | 548 | 10.4 | |
| 4358–5200 | 11° 46′ 20″ | .20546 | 102.7 | 842 | 8.2 | .027 |

With an accurate Littrow mount for the mirror and a reasonable precision of setting to ±10.8″ of arc the light on the exit slit can be controlled to ±2 cm.$^{-1}$.

The speed of the spectrometer depends in part on the permissible width of the entrance slit.

The following table gives slit widths for varying degrees of resolution.

*Table III*

| C (cm.$^{-1}$) | 5 | 6 | 7 | 8 | 9 | 10 | 11 | 12 |
|---|---|---|---|---|---|---|---|---|
| Slit | .076 | .0915 | .107 | .122 | .137 | .1525 | .168 | .183 |

Resolutions of from 5 to 6 cm.$^{-1}$ represent the extreme which is required only rarely for special research problems, whereas resolutions of from 10 to 12 cm. represent a routine work. This resolution is accompanied by a speed of two times that obtainable with the best available grating spectographs (the grating being used in the first order).

Even higher dispersion is possible with such compounds as ethyl, α-cinnamylidene propionate. The following table gives data with respect to this compound in the first line, and in the second line the corresponding data for trans methyl orthomethoxy cinnamate. The refractive index subscripts refer to the hydrogen and sodium lines. It will be seen that the dispersion of this compound is half again as great as methyl orthomethoxy cinnamate, permitting the use of a correspondingly wider entrance slit, namely, about 0.23 mm. The resulting gain in light energy is also 1½ and the linear dispersion (3 Å./mm.) of such an instrument is comparable to that obtained with a grating spectograph with a grating having a radius of curvature of 21' with 15,000 lines/inch used in the first order. (Such an instrument is not practical for Raman spectra.) The liquid referred to above, while showing much higher theoretical dispersion, is not quite as stable as methyl orthomethoxy cinnamate, and where extreme dispersion is not required the latter presents some practical operating advantages.

*Table IV*

| $n_\alpha$ | $n_D$ | $n_\beta$ | $n_\gamma$ | t ° C. | $(n_\beta - n_\alpha)$ | $(n_\gamma - n_\beta)$ |
|---|---|---|---|---|---|---|
| 1.60262 | 1.61553 He 5876 | 1.65283 | 1.69588 | 18.7 | 0.05021 | 0.04305 |
| 1.57609 | 1.58535 | 1.61182 | 1.64016 | 16.7 | 0.03573 | 0.02834 |

Fig. 4 shows a double monochromator with two autocollimated prisms. Light enters the entrance slit 2 and is reflected by the diagonal mirror 21 onto the diagonal mirror 3. The passage through the first autocollimated prism is the same as is described in Fig. 3 and the same parts bear the same reference numerals. The exit slit 12 serves as an entrance slit to a second autocollimated prism provided with parts corresponding to the first, bearing reference numerals increased by 10. Thus, the first diagonal mirror is designated 13 instead of 3, the off-axis parabolic mirror 14 instead of 4, etc. The light leaving this second part of the instrument is reflected by diagonal mirror 20 through a final exit slit 22.

The double monochromator is useful where monochromatic light of great purity is required. It does not present as great an advantage as the corresponding spectrometer because in a double monochromator the extremely high linear dispersion is of less importance. However, large light efficiency is obtained and for certain operations such a monochromator is justified. Mirrors 9 and 19 obviously have to turn together and a very accurate drive is necessary.

Figure 6:
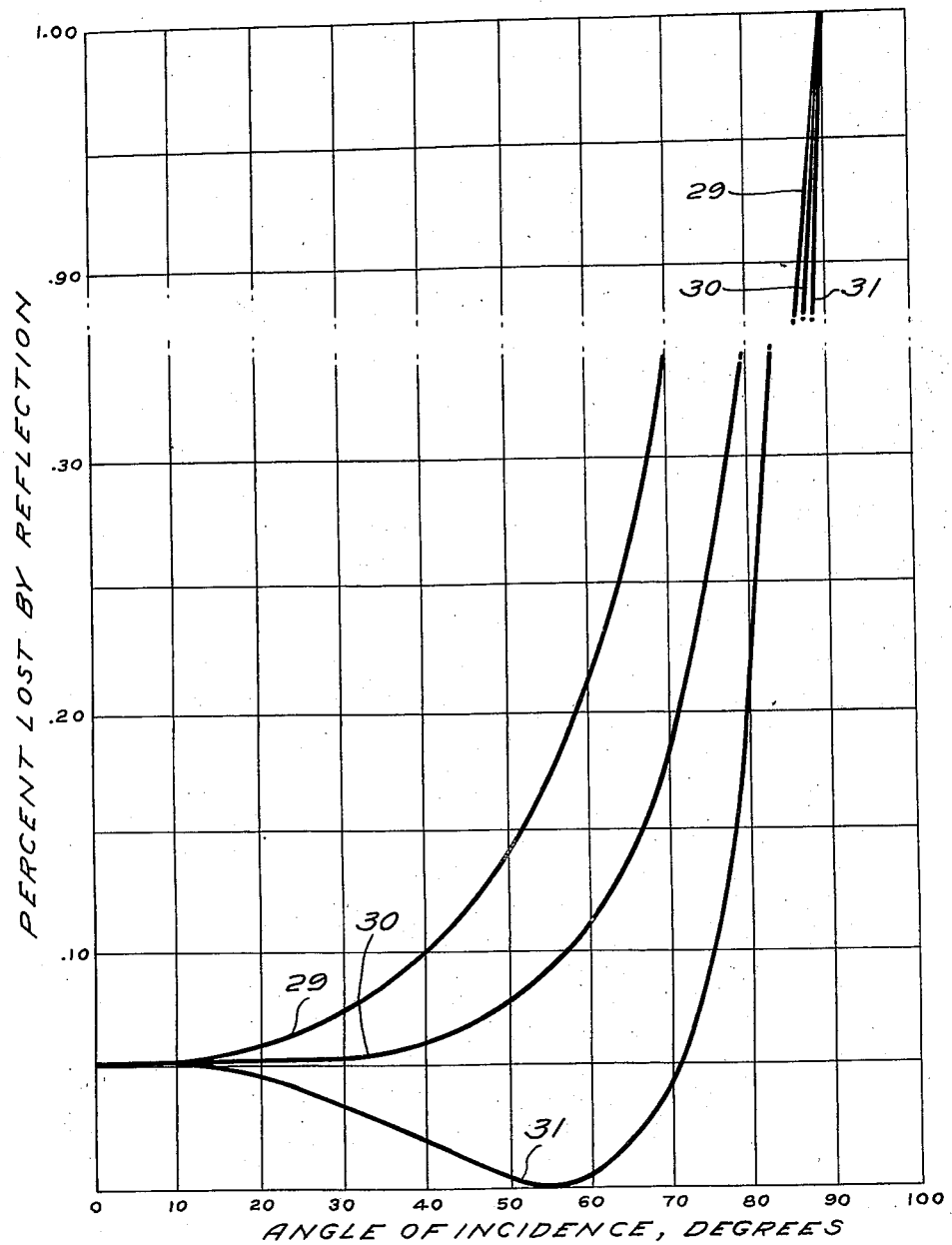
Fig. 6 is a series of curves showing reflection loss changes with inclination of prism end faces for unpolarized light and light vertically and horizontally polarized.

Fig. 5 illustrates a somewhat different type of Wernicke prism which may be used in the optical arrangements with off-axis parabolic mirrors. This prism is provided with two crown glass end prisms 25 and 26 having inclined faces 23 and 24, the inclination from vertical being represented by the angle 32. The central liquid prism 27 has a larger central angle than 120°. Thermostatting is effected by a surrounding jacket 28 in a manner similar to that of the Wernicke prisms described in connection with Figs. 1 to 4. The inclination of the end faces and the increase in central angle of the liquid prism permits the obtaining of somewhat larger dispersion. There is, however, some light loss from reflection. The light losses have been determined for various angles of incidence. In each case crown glass end prisms having a refractive index of about 1.6 are assumed, as this matches the refractive index of the center prism in about the middle of the Raman spectrum. Glass of slightly lower refractive index would have to be used where the instrument is to provide a path of minimum deviation through the prism for the middle of the visible spectrum. Fig. 6 shows the three curves 29, 30 and 31 for vertically plane polarized light, unpolarized light, and horizontally polarized light, respectively. As will be seen all of the curves start with slightly over 5% reflection loss for normally incident light, and of course show 100% loss for grazing incidence. Reflection loss for horizontally polarized light decreases to a minimum at Brewster's angle. Vertically plane polarized light increases rapidly and becomes significant when the angle of incidence exceeds about 25°. With unpolarized light angles of incidence up to about 40° are useful. For precision work on Raman spectra which require maximum efficiency with vertically plane polarized light, I prefer to use Wernicke prisms with normal light incidence, and hence vertical end faces. With inclined faces a beam of light necessarily has to make an angle with the base of the center prism in order to provide passage through the prism at minimum deviation in the middle of the spectrum, otherwise the prism is not utilized to full efficiency. This means that the angle of incidence for an inclined face is considerably greater than the angle 32. Fig. 6 deals with the angle of incidence which is the only significant quantity, and the corresponding limits of the angle 32 may be calculated using the constants for the particular end prisms chosen.

The advantages of a Wernicke prism depend, among other things, on the elimination of additional prism faces which would be necessary if the center prism were made of glass and cemented in with the usual types of cement, such as Canada balsam. The simplest way of achieving these advantages is for the center prism to be filled with a substance which is liquid at the temperatures under which the instrument is to be used. It is possible, however, with certain esters of the type referred to above which are low melting solids, to fill the center prism section with molten compound and to cautiously cool it, if necessary, under pressure. Where the solid esters are capable of sufficient flow so that they do not shrink away from the prism face on cooling, particularly when moderate pressure is applied, and form an optically isotropic solid, all of the optical advantages of the prism are retained and it behaves as a normal Wernicke prism. This type of Wernicke prism is, however, less desirable from a practical standpoint than those which use esters that are liquid at room temperature, because great care is required in making the prism and it must be carefully kept from conditions which might cause melting and recrystallization and destroy its optically isotropic character. Wernicke prisms in which the liquid has been carefully solidified to an optically isotropic solid are therefore included in the broader aspects of the present invention, although the practical advantages of prisms having a filling that is permanently liquid make these latter the preferred types.

I claim:

It will be noted that in Figs. 3 and 4 where the entrance and exit beams both strike the same off-axis parabolic mirror, the beams are not exactly parallel, otherwise separation would not be effected, but the average path of their center rays is approximately parallel the axis of the parabolic mirror, the deviation from exact parallelism remaining within the limits where aberration is negligible.

1. A monochromating device having a resolving power of 5 cm.$^{-1}$ to 6 cm.$^{-1}$ for all wave lengths greater than 4358 Å. and less than 5200 Å. comprising in optical alignment, an entrance slit and an off-axis parabolic collimating mirror, the entrance slit being substantially at the principal focus of the paraboloid of which the mirror is a portion and a Wernicke prism positioned so that the center reflected ray from the mirror passes through the prism substantially parallel to the prism axis, the beam from the collimating mirror striking the end face of the prism at an angle of incidence not departing from normal by more than a maximum of 40°.

2. A monochromating device having a resolving power of 5 cm.$^{-1}$ to 6 cm.$^{-1}$ for all wave lengths greater than 4358 Å. and less than 5200 Å. comprising in optical alignment, an entrance slit and an off-axis parabolic collimating mirror, the entrance slit being substantially at the principal focus of the paraboloid of which the mirror is a portion and a Wernicke prism positioned so that the center reflected ray from the mirror passes through the prism substantially parallel to the prism axis, the beam from the collimating mirror striking the end face of the prism at an angle of incidence not departing from normal by more than a maximum of 25°.

3. A monochromating device having a resolving power of 5 cm.$^{-1}$ to 6 cm.$^{-1}$ for all wave lengths greater than 4358 Å. and less than 5200 Å. comprising in optical alignment, an entrance slit, an off-axis parabolic collimating mirror, the entrance slit being substantially at the principal focus of the paraboloid of which the mirror is a portion and a Wernicke prism positioned so that the center reflected ray from the mirror passes through the prism substantially parallel to the prism axis, an exit slit, and reflecting means capable of imaging on the exit slit successive portions of the spectrum producible by the prism.

4. A monochromating device having a resolving power of 5 cm.$^{-1}$ to 6 cm.$^{-1}$ for all wave lengths greater than 4358 Å. and less than 5200 Å. comprising in optical alignment, an entrance slit and an off-axis parabolic collimating mirror, the entrance slit being substantially at the principal focus of the paraboloid of which the mirror is a portion and a Wernicke prism positioned so that the center reflected ray from the mirror passes through the prism substantially parallel to the prism axis, an exit slit, and reflecting means capable of imaging on the exit slit successive portions of the spectrum producible by the prism, the collimated beam striking the surface of the prism at an angle of incidence not departing from normal by more than a maximum of 40°.

5. A monochromating device having a resolving power of 5 cm.$^{-1}$ to 6 cm.$^{-1}$ for all wave lengths greater than 4358 Å. and less than 5200 Å. comprising in optical alignment, an entrance slit and an off-axis parabolic collimating mirror, the entrance slit being substantially at the principal focus of the paraboloid of which the mirror is a portion and a Wernicke prism positioned so that the center reflected ray from the mirror passes through the prism substantially parallel to the prism axis, an exit slit, and reflecting means capable of imaging on the exit slit successive portions of the spectrum producible by the prism, the collimated beam striking the surface of the prism at an angle of incidence not departing from normal by more than a maximum of 25°.

6. A monochromating device according to claim 3 in which the dispersed light beam after passing through the prism is reflected back through the prism by a movable mirror and imaged by the off-axis parabolic mirror on the plane of an exit slit to produce an autocollimated instrument.

7. A monochromating device according to claim 6 in which the Wernicke prism has glass end prisms symmetrically arranged and having substantially identical optical properties, the liquid section of the prism being filled with a substantially clear liquid ester of an acid having the formula:

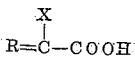

in which X is selected from the group consisting of hydrogen or alkyl and R is selected from the group consisting of

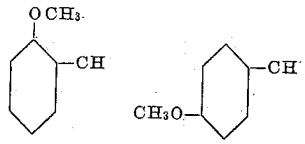

and

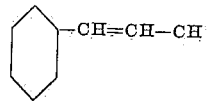

the glass of the end sections having a dispersion much less than the liquid ester.

8. A monochromating device according to claim 7 in which the dispersion curves of glass and liquid ester cross in the Raman spectra region between 4358 Å. and 5200 Å.

9. A monochromating device according to claim 4 in which the dispersed light beam after passing through the prism is reflected back through the prism by a movable mirror and imaged by the off-axis parabolic mirror on the plane of an exit slit to produce an autocollimated instrument.

10. A monochromating device according to claim 9 in which the Wernicke prism has glass end prisms symmetrically arranged and having substantially identical optical properties, the liquid section of the prism being filled with a substantially clear liquid ester of an acid having the formula:

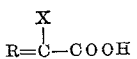

in which X is selected from the group consisting of hydrogen or alkyl and R is selected from the group consisting of

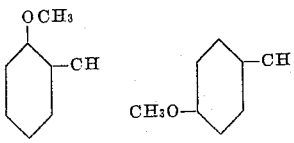

and

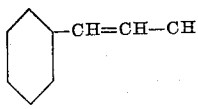

the glass of the end sections having a dispersion much less than the liquid ester.

11. A monochromating device according to claim 10 in which the dispersion curves of glass and liquid ester cross in the Raman spectra region between 4358 Å. and 5200 Å.

12. A monochromating device according to claim 5 in which the dispersed light beam after passing through the prism is reflected back through the prism by a movable mirror and imaged by the off-axis parabolic mirror on the plane of an exit slit to produce an autocollimated instrument.

13. A monochromating device according to claim 12 in which the Wernicke prism has glass end prisms symmetrically arranged and having substantially identical optical properties, the liquid section of the prism being filled with a substantially clear liquid ester of an acid having the formula:

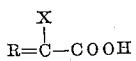

in which X is selected from the group consisting of hydrogen or alkyl and R is selected from the group consisting of

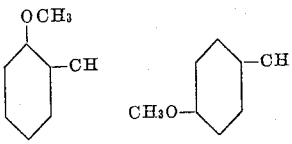

and

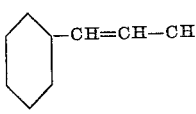

the glass of the end sections having a dispersion much less than the liquid ester.

14. A monochromating device according to claim 13 in which the dispersion curves of glass and liquid ester cross in the Raman spectra region between 4358 Å. and 5200 Å.

ROBERT FRANZ STAMM.

REFERENCES CITED

The following references are of record in the file of this patent:

UNITED STATES PATENTS

| Number | Name | Date |
|---|---|---|
| 1,450,061 | Coblentz | Mar. 27, 1923 |
| 2,170,435 | Sweeney | Aug. 22, 1939 |
| 2,458,973 | Barnes | Jan. 11, 1949 |

OTHER REFERENCES

Sawyer, R. A.: "Experimental Spectroscopy," published by Prentice-Hall Inc., copyright 1944, pages 73, 74, 81, 82, 83, 86, 87 and 279 cited. Copy in Div. 7.